US007627493B1

(12) United States Patent
Sarthi et al.

(10) Patent No.: US 7,627,493 B1
(45) Date of Patent: Dec. 1, 2009

(54) PRODUCTION AND DISTRIBUTION SUPPLY CHAIN OPTIMIZATION SOFTWARE

(75) Inventors: Samarth Sarthi, Pittsburgh, PA (US); Viswanathan Visweswaran, Pittsburgh, PA (US)

(73) Assignee: SCA Holdings, Pittsburgh, PA (US)

( * ) Notice: Subject to any disclaimer, the term of this patent is extended or adjusted under 35 U.S.C. 154(b) by 632 days.

(21) Appl. No.: 09/648,861

(22) Filed: Aug. 25, 2000

(51) Int. Cl.
*G06F 9/44* (2006.01)

(52) U.S. Cl. .............................. 705/7; 705/30; 705/35; 700/95

(58) Field of Classification Search ............... 705/7, 705/8, 30; 700/95, 99, 100
See application file for complete search history.

(56) References Cited

U.S. PATENT DOCUMENTS

| | | | | |
|---|---|---|---|---|
| 5,799,286 | A * | 8/1998 | Morgan et al. | 705/30 |
| 6,115,691 | A * | 9/2000 | Ulwick | 705/7 |
| 6,233,493 | B1 * | 5/2001 | Cherneff et al. | 700/95 |
| 6,950,802 | B1 * | 9/2005 | Barnes et al. | 705/7 |
| 2002/0049621 | A1 * | 4/2002 | Bruce | 705/7 |
| 2002/0178040 | A1 * | 11/2002 | Usami et al. | 705/7 |
| 2002/0198808 | A1 * | 12/2002 | Myers | 705/35 |

OTHER PUBLICATIONS

Rajiv D. Banker et al., "Relevant Costs, Congestion and Stochasticity in Production Environments", *Journal of Accounting and Economics*, Oct. 1987, pp. 171-197, Elsevier Science Publishers, North Holland.

Bala V. Balachandran et al, "On the Efficiency of Cost-Based Decision Rules for Capacity Planning", *The Accounting Review*, vol. 72, No. 4, Oct. 1997, pp. 599-619.

Robert S. Kaplan, "In Defense of Activity-Based Cost Management", *Management Accounting*, Nov. 1992, pp. 58-63.

Robin Cooper et al., "Measure Costs Right: Make the Right Decisions", *Harvard Business Review*, Sep.-Oct. 1988, pp. 96-103.

R.S. Kaplan et al., "The Promise and Peril of Integrated Cost Systems", *Harvard Business Review*, Sep.-Oct. 1995.

Srikant Datar et al., "Aggregation, Specification and Measurement Errors in Product Costing", *The Accounting Review*, vol. 69, No. 4 Oct. 1994, pp. 567-591.

R.S. Kaplan et al., "Overhead Allocation via Mathematical Programming Models", *The Accounting Review*, April, pp. 352-364, 1971.

Michaelpalles et al., "Strategic Transfer Pricing", *Management Science*, 44, pp. 451-461, 1998.

* cited by examiner

*Primary Examiner*—Vanel Frenel
(74) *Attorney, Agent, or Firm*—Buchanan Ingersoll & Rooney PC

(57) ABSTRACT

The present invention is directed to a method of modeling a complex system, the model produced by such a method, and a method of optimizing a complex system by optimizing such a model. The first step in the modeling method is to identify the activities that comprise the process. Measurable drivers for each activity are identified. The costs associated with each driver are identified as fixed and, where appropriate, variable components. Each activity is then represented as a function of its driver's cost components. Relationships between the drivers that are relevant to more than one activity are derived. A function that represents the process is built using the derived relationships. The model (function) thus produced is an expression of the entire process in terms of variables that are drivers for more than one activity within the process. Optimizing the modeled process is accomplished by optimizing the model constructed as described above for certain selected objective(s). The model can be modified by changing constraints thus enabling the user to run through a large number of "what if" scenarios to determine what is the best solution under varying conditions.

17 Claims, 3 Drawing Sheets

PRODUCTION AND DISTRIBUTION SUPPLY CHAIN OPTIMIZATION SOFTWARE

BACKGROUND OF THE INVENTION

1. Field of the Invention

The present invention is directed generally to the field of business accounting systems and, more particularly, to methods and apparatus for optimizing production and distribution supply chains as well as other complex systems.

2. Description of the Background

Production and distribution supply chains have grown into large and complex systems. Consider, for example, an automobile manufacturer. The thousands of components that go into an automobile are supplied by hundreds, perhaps thousands, of individual suppliers, each having its own suppliers, production facilities, labor costs, transportation costs, etc. The supply chain for such large enterprises is a very complex system and, unfortunately, is a result more of history than of a deliberate effort to build an optimized system. After the supply chain is in place, decisions tend to be localized such that their impact on the entire supply chain is not known until some history of operation under that decision is gathered. Even then, supply chains tend to be so complex and poorly understood, that even with historical operational data, it is often not known how best to change operations to move the entire system to a more optimized condition.

Current business techniques, such as activity based costing, provide a more reliable way of viewing a company's operations. In activity based costing, the cost and performance of activities and products is measured and quantified. An example of an automated, activity-based management system is disclosed in U.S. Pat. No. 5,799,286. Disclosed in that patent is a system in which traditional ledger accounting information and human resources information is used with other information directed to activities, equipment usage, and facilities utilization to generate costs associated with activities performed by the organization. The traditional accounting information and the activity information are fed into a relational database. The information is processed and costs associated with the employee, facilities, equipment, and overhead components of activities are computed. User defined reports for trending, forecasting, comparison, benchmarking, and budgeting purposes can be generated.

While such systems are a step forward, they represent the type of localized decision making that is not well suited to complex systems such as production and distribution supply chains. As mentioned previously, optimizing one organization within a production and distribution supply chain may lead to problems elsewhere in the system. Furthermore, traditional activity based costing models do not take into account non-economic considerations. Supply chains can have various non-economic measures of performance, which may or may not be important in optimizing the system. Some examples of these would include:

a. Product freshness: This measure is particularly important in supply chains in the food industry (for example, fast food restaurant chain), where the considerations of freshness will be as important as (if not more than) a purely economic decision. That is, some less than optimum procedures may need to be tolerated (deliveries every day at higher cost as opposed to every four days at lower cost) to ensure freshness of goods.

b. Product Lifecycle: This refers to the total time spent in a supply chain from the inception and design of a product to its ultimate delivery to an end customer. This is an important issue in industries with short lifecycles such as the garment industry, where the demand can be very unpredictable.

c. Robustness of solutions. The final optimized solution for the supply chain is with one set of values for the underlying variables. The range of the values for these variables, for which the solution is still a valid optimal solution, is the measure of the robustness of the solution.

Traditional activity based costing methods also do not provide sufficient flexibility to account for uncertainties in the market place. The most common and important source of uncertainty for a supply chain is likely to be in the projected demand for products. However, depending on the nature of the specific supply chain, the design may be very sensitive to factors such as raw material costs and availability (especially with commodity market sourcing) and exchange rates (in more international supply chain). In general, the uncertainty can occur due to:

a. Demand uncertainty—Product volumes, product mix b. Supply uncertainty—Raw materials availability, raw material costs c. Resource availability—Labor, unscheduled downtime of resources (lines, plants), costs of resources (labor, fuel)

d. Other factors—e.g. interest and exchange rates

It is important to note that each of these can have seasonal, promotional and regional/national effects. A key issue then is to design a system that is flexible in handling a large range of each of these variables, and to know the costs of building in this flexibility into the system.

To date, there is no system for modeling a complex supply chain, in an integrated manner, and that takes into account non-economic factors and market uncertainties. Accordingly, the need for such a system exists.

SUMMARY OF THE PRESENT INVENTION

The present invention is directed to a method of modeling a complex system or process, the model produced by such a method, and a method of optimizing a complex system or process by optimizing such a model. Turning first to the method of modeling, the first step is to identify the activities that comprise the system or process. Measurable drivers for each activity are identified. The costs associated with each driver are identified as fixed and, where appropriate, variable components. Each activity is then represented as a function of its driver's cost components. Certain of the drivers will be relevant to more than one activity. Those drivers are indicative of the interdependence between activities. Relationships between the drivers that are relevant to more than one activity are derived. A function that represents the system or process is built using the derived relationships. The function may also include certain of the drivers that are relevant to only one activity.

The model thus produced is an expression of the entire system or process in terms of variables that are drivers for more than one activity within the process. More specifically, the model is preferably embodied in a computer program as a series of instructions that express the system or process as a function of cost components for drivers for the activities that make up the system or process. As a result, the effects of changes on one activity can be seen throughout the entire system or process. When a production and distribution supply chain is modeled, the model of the present invention makes costs, cycle time, end products, and the like for the entire chain visible and understandable.

Finally, the present invention is directed to a method of optimizing a system or process. That is accomplished by optimizing the model constructed as described above for certain selected objectives. The model can be modified by changing constraints thus enabling the user to run through a large number of "what if" scenarios to determine what is the best solution under varying conditions.

Those advantages and benefits, and others, will be apparent from the description of the preferred embodiment hereinbelow.

BRIEF DESCRIPTION OF THE DRAWINGS

For the present invention to be easily understood and readily practiced, the present invention will now be described, for purposes of illustration and not limitation, in conjunction with the following figures wherein.

DESCRIPTION OF THE PREFERRED EMBODIMENTS

Figure 1:
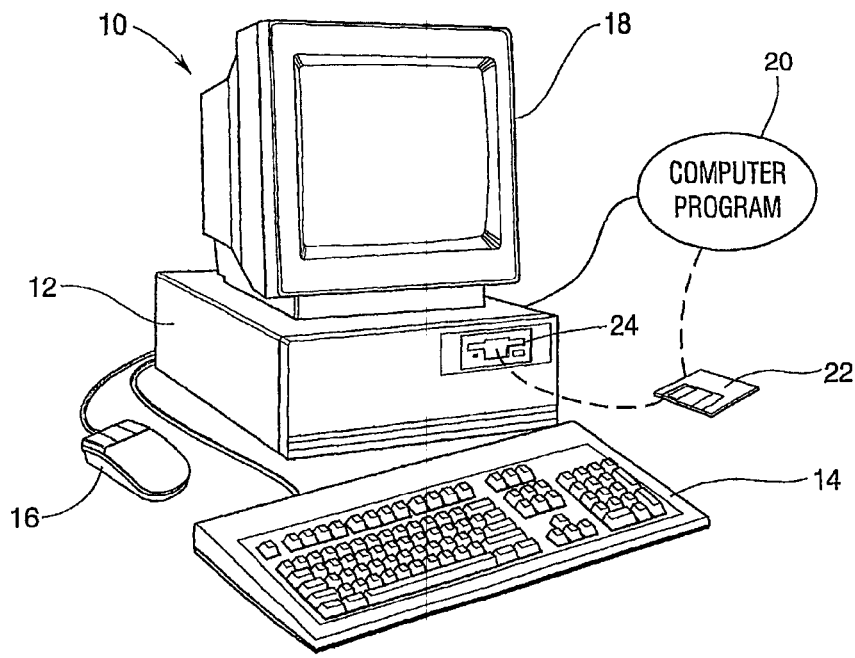
FIG. 1 illustrates a computer system upon which the software embodying the optimization model of the present invention may reside.

FIG. 1 illustrates a computer system 10 which may be comprised of a general purpose computer 12, a keyboard 14, mouse 16, and a monitor 18. Other types of input devices (scanners, microphones, etc.) and other types of output devices (speakers, printers, etc.) may be used depending upon the needs of the user. A computer program 20 embodying a model of a complex process or system, e.g. a production and distribution supply chain, constructed according to the present invention may reside on the hard drive (not shown) of the general purpose computer 12. Alternatively, the computer program 20 may reside on a disc 22 that is read by a disc drive 24, or the program 20 may be stored elsewhere and accessed by the computer system 10 through operation of a modem (not shown), a local area network (LAN), the Internet, the worldwide web via a browser, or other communications media. The present invention is not limited by the manner in which the computer program 20 is made available to the computer system 10 or by particular language used to implement the program 20.

There are at least three different aspects to the present invention:

1. a method of modeling a complex process or activity, such as a production and distribution supply chain;

2. the model produced as a result of the modeling method; and 3. using the model to manage the process or activity.

While the present invention is described in terms of a production and distribution supply chain, the reader will recognize that other complex processes or systems could be similarly modeled and managed. The complex process may include one or more:

a. Manufacturing systems;
b. Distribution systems;
c. Raw material sourcing;
d. Second (or multi) tier supply and sourcing; and
e. Retail operations.

Figure 2:
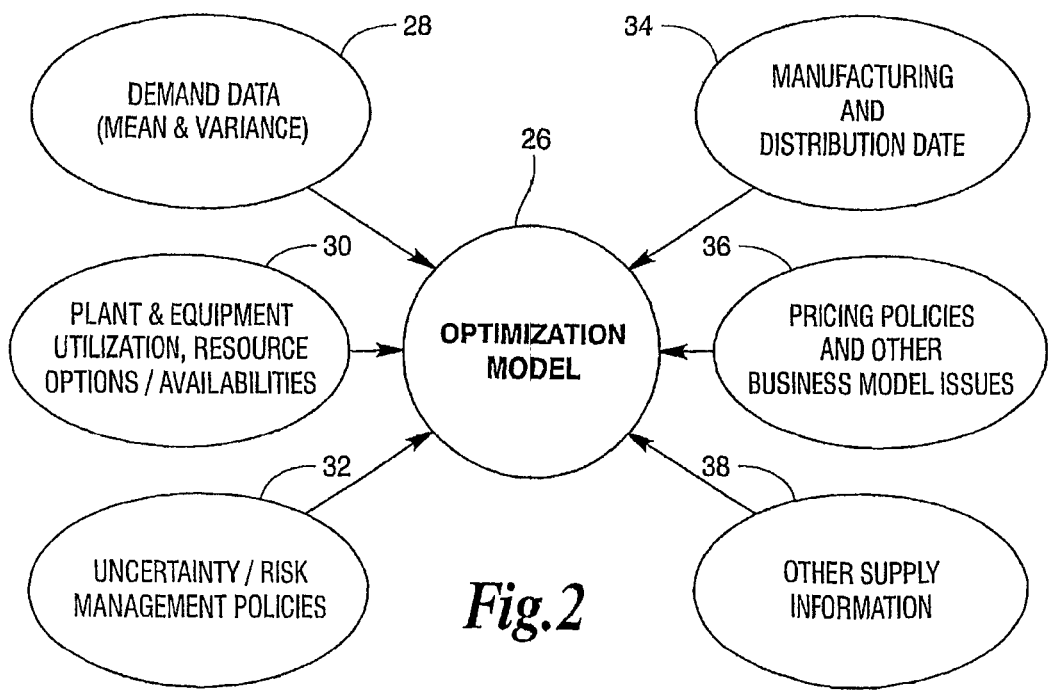
FIG. 2 is a conceptual block diagram of the various types of information that are taken into account by the modeling process of the present invention when constructing a model according to the teachings of the present invention.

FIG. 2 is a conceptual block diagram of the various types of information that are taken into account when constructing an optimization model 26 according to the teachings of the present invention. The optimization model 26 takes into account demand data 28, plant and equipment utilization, resource options/availabilities 30, uncertainty and risk management policies 32, manufacturing and distribution data 34, pricing policies and other business model issues 36, and other supply information 38. The present invention integrates these various types of information to provide a structured model 26 of, for example, a production and distribution supply chain.

The present invention takes a holistic approach to modeling complex processes and systems. Through the modeling process of the present invention, concepts in economics, decision theory, activity based management, operations research, uncertainty management and real options are integrated to produce the optimization model 26 of the present invention. The model 26 is an easy to use, practical solution to, for example, production and distribution supply chain management and optimization. Decision makers can use the model of the present invention to optimize the supply chain by working through various strategies, to view the effects of reengineering the supply chain, or to make investment decisions to respond to current and emerging business needs. The model 26 enables decision makers to work collaboratively to develop optimal solutions based upon actual measurements. The model 26 makes costs, cycle time and end products for the entire supply chain visible and understandable. The impact of local actions can be seen upon the entire chain. The model 26 may be used to reduce costs, reduce cycle time and increase product diversity.

Figure 3:
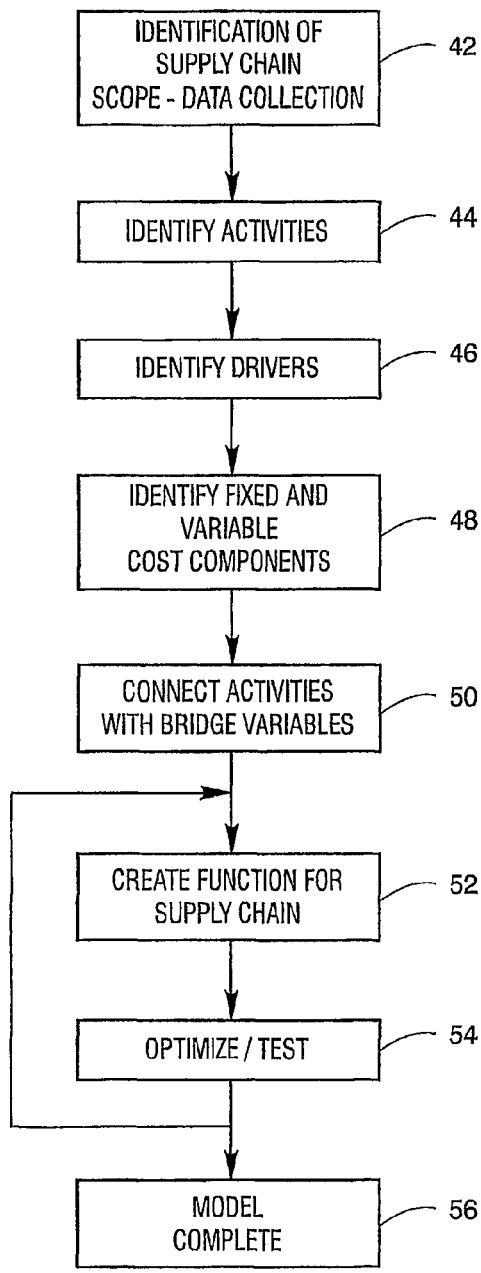
FIG. 3 is a block diagram of the method of building a model of a production and distribution supply chain according to the teachings of the present invention.

Turning now to FIG. 3, FIG. 3 illustrates a method 40 for constructing a model of a production and distribution supply chain. The reader will understand that the method 40 of FIG. 3 may be applied to any complex system or process. The first step in method 40 is step 42 which is an identification of the supply chain and data collection related to the supply chain. In most instances, businesses will already have between 70% and 90% and the data needed for construction of the model. The next step of FIG. 3, step 44, is to identify the activities that comprise the process. All supply chains are composed of a number of value-adding activities that are performed in succession to deliver a set of products or services to their customer, which may be another node in the production and distribution supply chain. These value adding activities include activities related to procurement of goods and services, manufacturing and warehousing, distribution, sales and corporate activities that add indirect costs to the supply chain. The supply chain can thus be broken down into a distinct set of such activities, i.e.

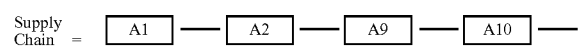

where A1, A2, ..., A9, A10, etc. are distinct activities that, taken together, constitute the supply chain.

The next step, step 46, requires that the key drivers for each activity, and the resources needed for that activity, be identified. Each activity in the supply chain depends on one or more variables that drive its costs. These variables are the activity drivers, and the cost of the activity can be represented as a function of these drivers:

$$\text{Cost}_{A1} = F(v_1, v_2, v_3, \ldots)$$

where $F(\ldots)$ refers to a function of one or more variables (v). Here, $v_1, v_2, v_3$ etc are the activity drivers for activity 1. The drivers for each activity depend on the kind of activity being performed. For example, production activities will typically depend on the hours of production as well as the volume of product being made, while an order receiving activity may depend on the number of orders received from customers. This part of the modeling process is similar to activity cost accounting.

As an example, consider the activity of storing a number of cases of various products in inventory at a distribution center that serves a number of demand points (such as stores or restaurants). The average number of cases that is stored in inventory on any given day, usually referred to as the cycle stock, depends on the average case volume that is to be delivered to the stores. However, to handle day to day variance in the demand from the stores, the distribution center will typically keep a buffer stock in addition to the cycle stock. The cost of the storage activity is then a sum of the cost of storing the cycle stock and buffer stock. The primary driver for this cost is the average demand from the stores, while a secondary driver for the cost is the variance in the predicted demand from the stores.

As another example, consider the issue of product freshness in designing a food distribution system. Freshness of food items (very important to consumer tastes and perceptions) is typically measured in terms of their shelf life, which can range from 6-8 days for produce items (tomatoes, lettuce) to 3-6 months for frozen meat. The optimal design of such a system must therefore ensure that the produce items such as tomatoes are delivered to the end customer no later than 6-8 days from when they were picked at the farms. This, in turn, depends on the delivery frequency of the distributors, i.e. how often the produce items are shipped from supplier to DCs and from DCs to stores. The cost of the distribution system, in turn, is affected by the delivery frequency, with ordering and shipping costs typically going up as delivery frequency increases (from say once every 4 days to once a day). Therefore, the delivery frequency is a critical driver in the design of a distribution system for short shelf life items. Similarly, other measures of the system such as cycle time, robustness, etc. can be modeled.

Step 48 is to break down the activity costs into fixed and, where appropriate, variable components and represent each activity as a function of its cost components. Each activity cost typically has a fixed cost component and a variable cost component, which usually depend on different drivers. The fixed cost of the activity depends on the maximum expected level of the activity drivers, and is therefore limited by the capacity of the activity. The variable costs of each activity, on the other hand, typically depend only on the mean or average level of the activity drivers.

Consider again the example of the inventory storage activity. If d is the average volume of cases expected from the demand points, and cσ is the expected variance in the demand from day to day, then $$\text{Cost}_{inv} = VC_{inv} + FC_{inv}$$

$$VC_{inv} = C_V(d)$$

$$FC_{inv} = C_F(d + 2\sigma)$$

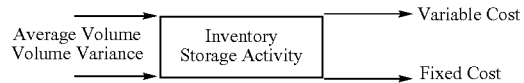

where $C_V$ and $C_F$ are the unit variable and fixed costs, respectively, and $VC_{inv}$ and $FC_{inv}$ are the variable and fixed costs of inventory, respectively. While the fixed and variable cost classification is the most common, it is only one of several possible classifications. Some components of costs can sometimes require more complex functionality. For example, when the additional capacity for storage can only be added in increments, then the fixed costs of inventory storage will then become a step function.

In step 50, an interrelationship between activities is established by identifying drivers that are relevant to more than one activity. Those drivers are referred to as bridge or system variables. While each activity in the supply chain has its own driver(s), there is usually a common set of drivers or variables that connect two or more activities in the supply chain together. The relationships between the bridge variables allows the entire supply chain to be represented using a single function.

Consider another activity such as transportation, by which the cases from the aforementioned distribution center are delivered to one or more stores. This activity cost is a complex function of the number of routes and miles needed to deliver the cases to the stores. It may be represented as $$VC_{Trans} = F(\text{Routes}, d)$$

$$FC_{Trans} = F(\text{Routes}, d)$$

However, the number of routes in turn depends on the case volume being delivered, i.e.

$$\text{Routes} = F(d)$$

It can thus be seen that the case volume, d, may be used as a bridge variable, because it affects the cost of both the transportation and inventory storage activities.

Turning to step 52, once all such bridge variables are identified, the functionality for relating the drivers for each activity in the supply chain to these bridge variables is determined. That allows the costs of each activity to be modeled as a function of the bridge variables. For example, if the transportation is done using trucks (with one route per truck), and the capacity of each truck is 1000 cases with an average packing efficiency of 80%, then $$\text{Routes} = d/(1000 \times 0.8)$$

$$= d/800$$

The costs of each activity are then modeled as a function of the bridge variables. Thus, $$VC_{Trans} = F(d)$$

$$FC_{Trans} = F(d)$$

The total supply chain cost is then simply a sum of the cost of all the activities, i.e.

$$VC_{SC} = VC_{A1} + VC_{A1} + \ldots + VC_{A9} + VC_{A10} + \ldots$$

$$FC_{SC} = FC_{A1} + FC_{A1} + \ldots + FC_{A9} + FC_{A10} + \ldots$$

Where $VC_{A1}$ is the variable cost of activity 1 (and so on). Then, the total cost of the supply chain is $$TC_{SC} = VC_{SC} + FC_{SC}$$
$$= F(b_1, b_2, \ldots, b_{10}, \ldots, p)$$

where $b_1, b_2 \ldots$ are the various bridge variables in the supply chain (such as the case volume d in the example above) and p is a set of constraints.

Once the supply chain is modeled as a function of at least the bridge variables, the function will be optimized at step 54 with known data or otherwise tested to verify the accuracy of the model. As a result, some modifications to the model may be made. Once the model is completed at step 56, it is ready to be used to manage the system or process that has been modeled.

Figure 4:
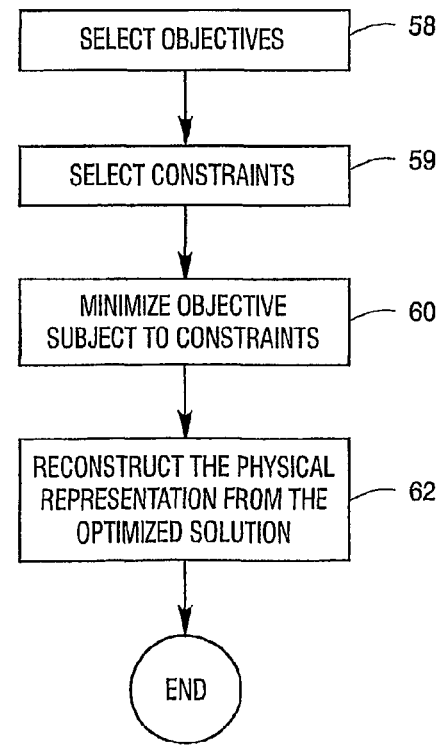
FIG. 4 is a block diagram of the method of using the model of the present invention to manage a production and distribution supply chain.
Figure 5:
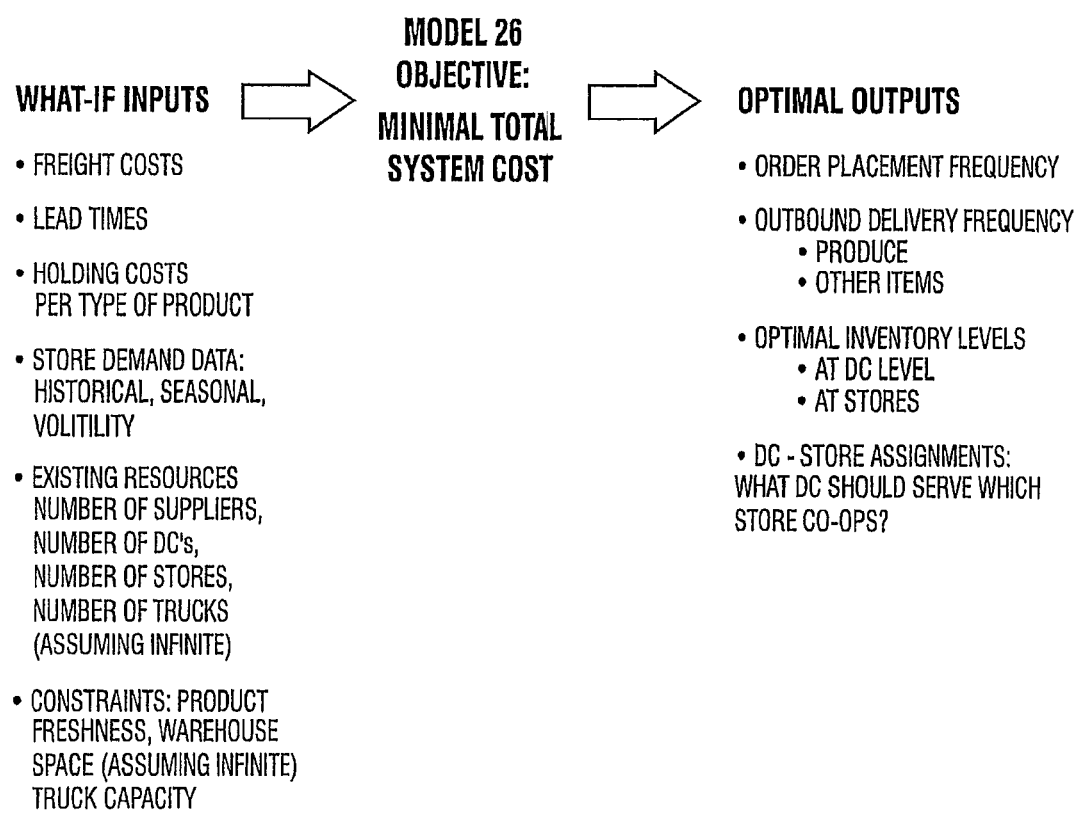
FIG. 5 illustrates exemplary inputs and outputs in a case where a model of the present invention is used to minimize costs

FIG. 4 is a block diagram illustrating how the model 26 of the present invention may be used to manage a complex system that has been modeled while FIG. 5 illustrates exemplary inputs and outputs in a case where the model 26 is being used to minimize costs. The reader will recognize that using the model to minimize costs is only one way in which the model 26 may be used to manage a complex system. Other objectives include maximizing freshness, minimizing delivery frequencies, or any of a large number of other objectives.

In step 58, the objective(s) to be solved for are selected. In step 59 the constraints to be applied are selected. As an alternative to optimizing the model for a given objective function, the model 26 can be optimized by using these measures in the constraints of the model In step 60 the model is minimized by minimizing the function which is representative of the process. For example, Minimize $TC_{SC} = F(b_1, b_2, \ldots, b_{10}, \ldots, p)$
subject to
Capacity Constraints
Labor Constraints
Business Constraints
$F(CycleTime_{SC}) <= 0$ Here, the objective is to minimize the total cost of the supply chain, with a constraint on the total cycle time of the supply chain. If the supply chain is to be analyzed from a short-term perspective, then typically only the variable costs will be used in the objective (instead of the total cost).

The model is then solved using either standard or customized algorithms for optimization. The complexity of the functionality of the costs and constraints in the system will determine the choice of the optimization algorithm. If all the cost functions and constraints are linear, then a linear programming (LP) algorithm is used. If there are step functions or discrete decisions (such as a decision to add or remove a production line) involved, then a mixed-integer linear programming (MILP) solver is used. If any of the functionality is nonlinear, then a mixed-integer nonlinear programming (MINLP) algorithm is used.

The final step 62 is to reconstruct the physical representation from the optimized model. Recall that the supply chain has been modeled primarily as a function of the bridge variables. The relationship of the bridge variables to each activity may or may not be inherent. Once the supply chain model has been optimized, then the original activity drivers and activity costs can be calculated from the bridge variables. For example, suppose that the optimal case volume d (which is a bridge variable) for the transportation and inventory storage activities is 100,000. In the transportation activity, the number of routes can be calculated as $$\text{Routes} = d/800$$
$$= 125$$

The variable transportation costs can then be calculated as $$VC_{Trans} = F(\text{Routes}, d) = F(125, 100000)$$

Similarly, the fixed and total costs of transportation can be calculated. This step 48 allows the reconstruction of the physical representation of the supply chain activities, such as the individual capacity needed, resource requirements (such as the number of trucks required to service the routes for transportation in this example), the financial impact of any changes in the system, and other operational variables such as lead times, product quality, etc.

The model performs supply chain decision analyses in a multi-product, multi-plant, manufacturing and multi-tier distribution environment. The model incorporates the effect of lead-times, costs and other value drivers in the various activities comprising the supply process. Thus, after step 62 is complete, it is possible to return to steps 58 and 59, and either change the objectives or change the constraints, or both, and run the model again to see what happens under the changed conditions. FIG. 5 provides an illustration of exemplary inputs, constraints and outputs.

Models produced according to the method of the present invention may be focused primarily on measuring the supply chain performance for a given user-defined supply chain architecture and process. The model uses constraints (such as business rules, capacity etc.) to evaluate or optimize the decision variables selected. The user can modify the process or the constraints to see the impact on the chain's performance. The user can thus compare different alternatives. Usually, the "dependent decisions" or decisions that depend from the supply chain design (such as number of manufacturing lines, vendor DC alignment etc.) can be optimized for the least system cost if the user desires.

While the present invention has been described in conjunction with preferred embodiments thereof, those of ordinary skill in the art will recognize that many modifications and variations are possible. The foregoing description and the following claims are intended to cover all such modifications and variations.

What is claimed is:

1. A computer-implemented method of managing a process, said computer implemented method comprising:
    identifying activities that comprise the process, wherein the process is a series of activities, wherein an input of at least one subsequent activity is dependent on an output of at least one previous activity;

identifying drivers associated with at least one metric, reflecting an efficiency of said process, for each of the activities;

identifying, in a computer, bridge variables from said identified drivers, wherein each bridge variable is a driver that is relevant to more than one of said activities;

establishing, in a computer, a relationship between various drivers by representing at least one non-bridge variable driver in terms of one or more of said bridge variables;

using said relationship, representing activities at least as a function of one or more of said bridge variables, thereby reflecting interdependence between said activities to represent the entire series of activities of said process, in a computer;

generating, in a computer, a model of said process at least as a function of said bridge variables by combining representations of activities comprising said process; and outputting, from said model in a computer, a predictive metric reflecting an efficiency of the total process.

2. The computer-implemented method of claim 1, further comprising:

selecting a plurality of constraints, wherein generating said model of said process includes generating said model as a function of said bridge variables and said plurality of constrains.

3. The computer-implemented method of claim 2, further comprising:

optimizing said model in view of said plurality of constraints using one of the following:
a linear programming algorithm,
a mixed-integer linear programming algorithm, and
a mixed-integer nonlinear programming algorithm; and reconstructing a representation of said activities and said drivers using said optimized model.

4. The new computer-implemented method of claim 3, wherein said reconstructing includes calculating a value of at least one non-bridge variable driver using values of corresponding bridge variables, and calculating a value of activities using values calculated for bridge variable driver and non-bridge variable driver of respective activities.

5. The computer-implemented method of claim 3, further comprising:

revising said model using the results from said optimization step.

6. The computer-implemented method of claim 2, wherein selecting said plurality of constraints includes setting economic and non-economic constraints.

7. The computer-implemented method of claim 1, wherein identifying measurable drivers include identifying economic and non-economic drivers.

8. The computer-implemented method of claim 1, wherein identifying said drivers includes identifying at least one of fixed and variable components of each said driver, and wherein said method further comprising:

determining said metric of each said driver based on said at least one of fixed and variable components thereof.

9. A system comprising:

a computer;

input and output devices in communication with said computer; and a memory encoded with a computer program, which, when executed by said computer, causes said computer to perform the following:

allow a user to identify activities that comprise a process, wherein the process is a series of activities, wherein an input of at least one subsequent activity is dependent on an output of at least one previous activity, further allow said user to identify measurable drivers associated with a at least one metric, reflecting an efficiency of said process, for each of the activities;

identify bridge variables from said identified drivers, wherein each bridge variable is a driver that is relevant to more than one of said activities; establish a relationship between various drivers by representing at least one non-bridge variable driver in terms of one or more said bridge variables; using said relationship, represent activities at least as a function of one or more of said bridge variables, thereby reflecting interdependence between said activities to represent the entire series of activities of said process; generate a model of said process at least as a function of said bridge variables by combining representations of activities comprising said process; and output, from said model, a predictive metric reflecting an efficiency of the total process.

10. The system of claim 9, wherein said computer program, upon execution by said computer, causes said computer to further perform the following:

further allow said user to select a plurality of constraints;

incorporate said plurality of constraints in said model of said process;

optimize said model in view of said plurality of constraints using one of the following:
a linear programming algorithm,
a mixed-integer linear programming algorithm, and
a mixed-integer nonlinear programming algorithm; and reconstruct a representation of said activities and said drivers using said optimized model.

11. The system of claim 10, wherein said computer program, upon execution by said computer, causes said computer to perform said reconstruction by calculating a value of at least one non-bridge variable driver using values of corresponding bridge variables and by calculating a value of activities using values calculated for bridge variable drivers and non-bridge variable driver of respective activities.

12. A computer-readable data storage medium containing program instructions, which, when executed by a processor, cause said processor to perform the following:

allow a user to identify activities that comprise a process, wherein the process is a series of activities, wherein an input of at least one subsequent activity is dependent on an output of at least one previous activity;

further allow said user to identify drivers associated with a metric reflecting an efficiency of said process for each of the activities;

identify bridge variables from said identified drivers, wherein each bridge variable is a driver that is relevant to more than one of said activities;

establish a relationship between various drivers by representing at least one non-bridge variable driver in terms of one or more of said bridge variables;

using said relationship, represent activities at least as a function of one or more of said bridge variables, thereby reflecting interdependence between said activities to represent the entire series of activities of said process;

generate a model of said process at least as a function of said bridge variables by combining representations of activities comprising said process; and output, from said model, a predictive metric reflecting on efficiency of the total process.

13. The storage medium of claim 12, wherein said program instructions, upon execution, cause said processor to further perform the following:
- further allow said user to select a plurality of constraints;
- include said plurality of constraints in said model of said process; and
- optimize said model in view of said plurality of constraints using one of the following:
  - a linear programming algorithm,
  - a mixed-integer linear programming algorithm, and
  - a mixed-integer nonlinear programming algorithm; and
- revise said model using the results from optimizing said model.

14. The storage medium of claim 12, wherein said program instructions, upon execution, cause said processor to reconstruct a representation of said activities and said drivers by calculating a value of at least one non-bridge variable driver using values of corresponding bridge variables and by calculating a value of activities using values calculated for bridge variable driver and non-bridge variable driver of respective activities.

15. The storage medium of claim 12, wherein said program instructions, upon execution, cause said processor to cost each said driver identified by said user.

16. A computer-implemented method of managing a process, said computer implemented method comprising:
- identifying activities that comprise the process, wherein the process is a series of activities, wherein an input of at least one subsequent activity is dependent on an output of at least one previous activity;
- identifying drivers associated with at least one metric, reflecting an efficiency of said process, for each of the activities, wherein identifying said drivers includes identifying at least one of fixed components and variable components of each said driver;
- determining, in a computer, a metric for each said driver based on said at least one of fixed components and variable components thereof;
- generating, in a computer, a model of said process at least as a function of said drivers by combining representations of activities comprising said process; and
- outputting, from said model in a computer, a predictive metric reflecting an efficiency of the total process.

17. A method of claim 16, wherein the fixed and variable components of each said driver are the fixed and variable costs of each said driver.

* * * * *